United States Patent [19]
Danehy et al.

[11] 3,777,524
[45] Dec. 11, 1973

[54] METHOD AND APPARATUS FOR COLD ROLLING MILL GAUGE DEVIATION CORRECTION

[75] Inventors: Robert P. Danehy; Bruce N. Kitchell, both of Williamsville, N.Y.; Antonio V. Silva, San Paulo, Brazil

[73] Assignee: Westinghouse Electric Corporation, Pittsburgh, Pa.

[22] Filed: July 21, 1972

[21] Appl. No.: 273,896

[52] U.S. Cl. ............................................ 72/8
[51] Int. Cl. .......................................... B21b 37/00
[58] Field of Search ............................ 72/8–10, 72/16

[56] References Cited
UNITED STATES PATENTS
3,253,438  5/1966  Stringer ............................ 72/12
3,625,037  12/1971  Michel ............................. 72/21 X Primary Examiner—Milton S. Mehr
Attorney—F. H. Henson et al.

[57] ABSTRACT

Mill spring constant change signals are produced after each of a series of screwdown regulation cycles where each change signal is produced as a function of the ratio of the gauge deviation remaining after the regulation cycle, to the change in rolling force which occurred during the regulation cycle. The series of ratio change signals are then averaged to produce a mill spring constant correction signal which is used to correct the previously established mill spring constant. The corrected mill spring constant is then used to generate a new screwdown reference signal for the next series of regulation cycles. Provision is made to limit check and average gauge deviation so that the mill spring corrections are only made when certain predetermined gauge deviation limits are exceeded.

18 Claims, 9 Drawing Figures

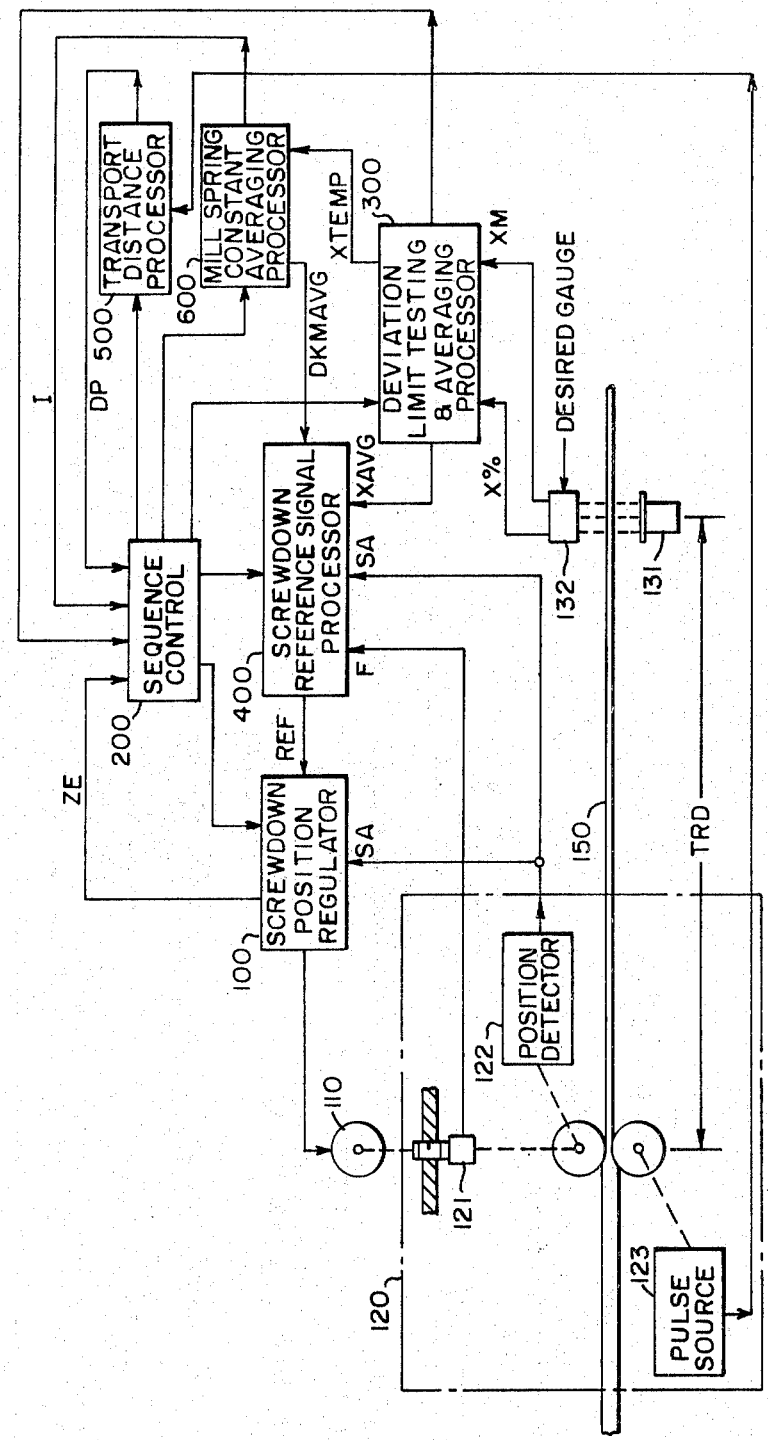

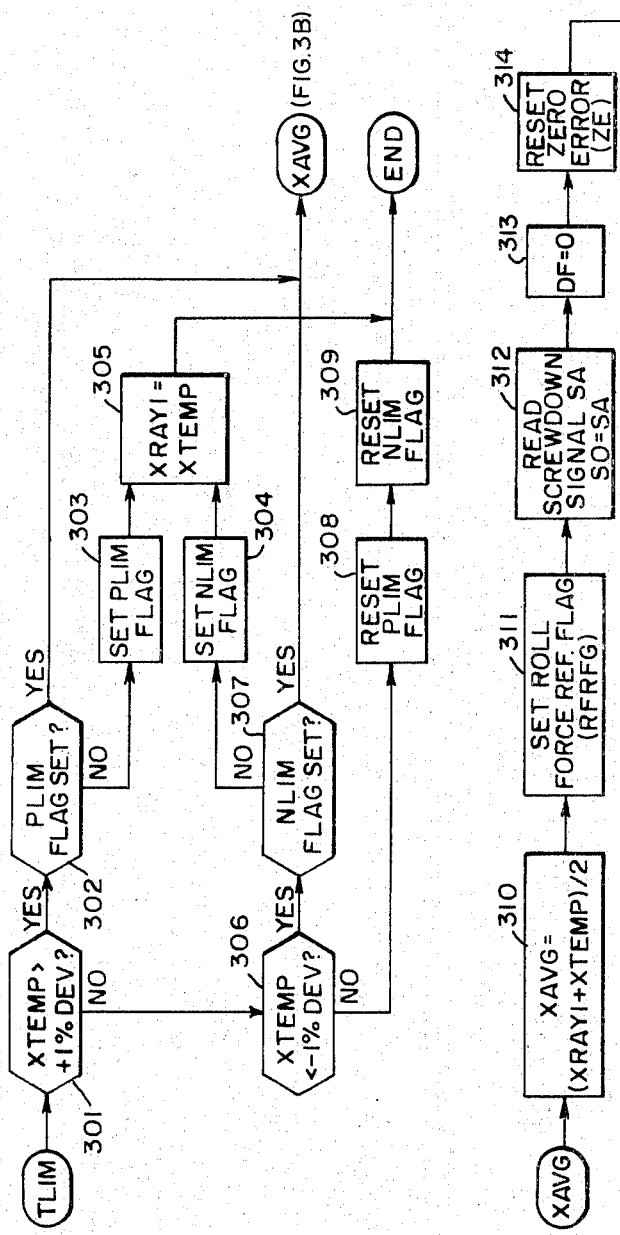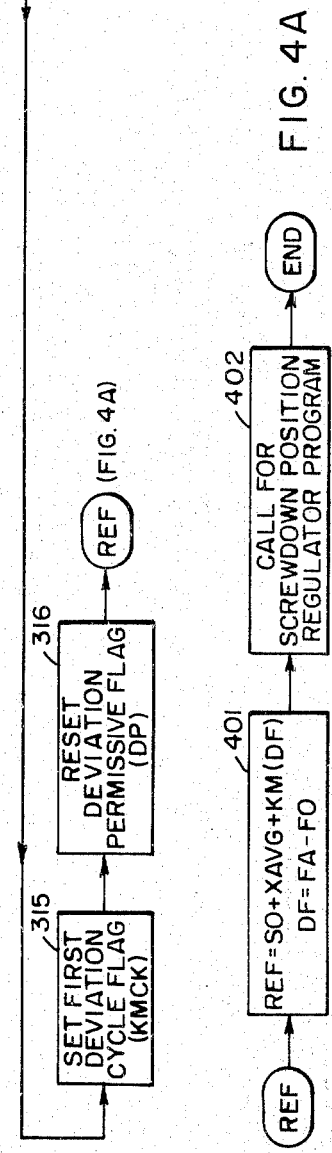
FIG. 3A  FIG. 3B  FIG. 4A

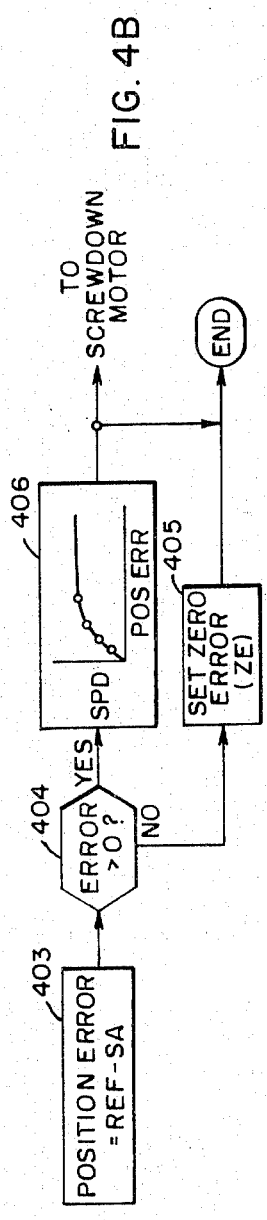
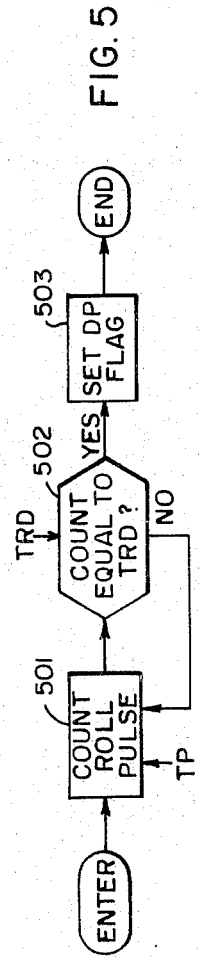
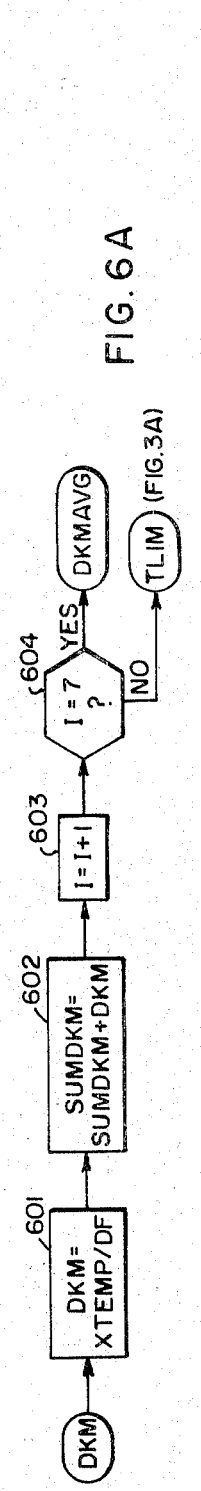
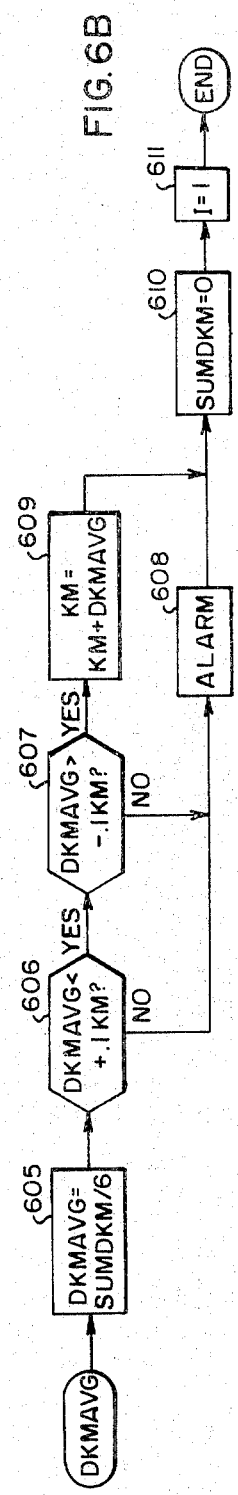
FIG. 4B
FIG. 5
FIG. 6A
FIG. 6B 3,777,524

METHOD AND APPARATUS FOR COLD ROLLING MILL GAUGE DEVIATION CORRECTION

BACKGROUND OF THE INVENTION

Rolling mill control systems are presently available wherein a screwdown position regulator is employed to drive a motor to establish a screwdown position corresponding to a reference input signal. The reference input signal has, heretofore, been developed as a function of the summation of an initial screwdown setting, a gauge deviation measurement, and a mill spring correction factor introduced to compensate for gauge deviation due to mill stretch. In the present practice, the mill spring correction factor is established as the product of a mill spring constant and measured rolling force change.

The mill spring constant (referred to as KM herein) has, heretofore, been set for an average product with manual variations being made to account for changes in the width of the strip to be rolled. It has been found, however, that temperature changes and other factors cause the so-called KM constant to vary during rolling so that the screwdown position regulator cannot establish the proper screwdown position to properly eliminate the measured gauge deviation. As a result, some product is lost before the system operation can be adjusted to make the proper correction to reduce the gauge deviation to less than an acceptable limit.

SUMMARY OF THE INVENTION

A method and apparatus for automatically updating the mill spring constant (KM) during rolling and then for continuously testing gauge deviations to adjust this constant are provided. The screwdown position is regulated, as previously, to reduce the error between the screwdown reference (REF) and the actual measured screwdown position (SA) to substantially zero. When this approximate zero is detected, a transport delay cycle is initiated during which roll movement pulses are counted to precisely measure the distance between the rolling stand and the point of gauge deviation measurement. The gauge deviation remaining from the previous regulation cycle is then divided by the rolling force change which occurred during the regulation cycle to produce a first mill spring constant change or difference signal (DKM). The regulation cycle is then repeated as soon as another gauge deviation is measured which exceeds a predetermined limit and, when the approximate zero error signal is detected during the second regulation cycle a second transport delay count is performed and then the second DKM signal is generated and added to the first to produce a SUMDKM = DKM1 + DKM2. The above cycles are repeated providing a number (N) of DKM signals and SUMS thereof so that an average mill spring correction signal DKMAVG may be developed as:

$$DKMAVG = SUMDKM/N.$$

This mill spring correction signal is added to the previous mill spring signal KM to form an updated signal KM (KM = KM + DKMAVG) and the system then continues to test for gauge deviations as before. If further deviations occur, a new series of DKM change signals are averaged for further KM updating.

The automatic updating of the mill spring constant results in a rapid correction of the initial KM setting and improves the gauge regulation accuracy. It is estimated that an increase from 80 percent to approximately 90 percent of the bar or ingot rolled may be kept within the desired gauge limits with the method of the invention.

The above and other objects and features of the invention will become apparent from the following detailed description taken in connection with the accompanying drawings which from a part of this specification, and in which:

FIG. 1 is a block diagram of a system employing the present invention;

FIG. 2 is a flow diagram setting forth the function of sequence control 200 of FIG. 1;

FIGS. 3A and 3B are functional flow diagrams setting forth the function of processor 300 of FIG. 1;

FIGS. 4A and 4B are flow diagrams setting forth the function of screwdown reference signal processor 400 as it is associated with screwdown position regulator 100;

FIG. 5 is a flow diagram setting forth the function of transport distance processor 500; and FIGS. 6A and 6B are flow diagrams setting forth the function of mill spring averaging processor 600 of FIG. 1.

In FIG. 1, the screwdown position of the rolls in a mill stand 120 is controlled through a motor 110 which receives an appropriate drive signal from a screwdown position regulator 100. Mill stand 120 includes appropriate screwdown means 121 which includes a load cell or other device for producing a rolling force signal F which is used in the processing function of means 400 to be described. The stand also includes a screwdown position measuring device 122 which produces a signal SA corresponding to the actual screwdown position therein. The function of regulator 100 is to drive screwdown mechanism 121 until the difference between signals REF and SA is approximately zero. While the regulator may be conventional in most respects it includes additional means for detecting the approximate zero condition in the difference between signals REF and SA and for producing an output signal ZE representing the occurrence of the approximate zero error.

A sequence control 200 is provided which may be part of a computer program which will be described which responds to the zero error signal ZE and initiates a transport distance counting cycle in a processor 500 which also receives roll movement pulses TP from a suitable transducer 123 in stand 120. The function of processor 500 is to count signals TP until strip 150 being rolled has moved through the distance referenced as TRD between the rolls and an XRAY measuring station where an X-ray source 131 provides XRAY's which are read by a gauge deviation measuring device 132.

Device 132 produces a gauge deviation output signal referenced as X% and a gauge deviation measurement signal XM which are applied to a deviation limit testing and averaging processor 300 which will be considered in detail with respect to FIGS. 3A and 3B. The function of processor 300 is to detect gauge deviations exceeding a predetermined limit such as 1% and to average successive such deviations to produce a signal referenced as XAVG which is applied to processor 400.

When the transport distance TRD has been moved following the completion of a zero regulation cycle, processor 500 produces a signal referenced as DP which initiates the operation of mill spring constant averaging processor 600. The function of processor 600 at this time is to compute the ratio DKM = KTEMP/DF where XTEMP is the gauge deviation measurement XM made immediately following the zero error detection and DF is the change in rolling force which occurred during the last regulation cycle before the zero error. Processor 600 includes means for summing successive DKM signals until a predetermined number N has been generated and then is operated to divide by that number to produce an average mill spring correction signal DKMAVG which may be defined as SUMDKM/N, where SUMDKM represents the summation of N successive DKM signals as defined above. After appropriate limit tests are made upon signal DKMAVG to determine whether the correction is acceptable, the previous mill spring constant KM is corrected by adding the average correction if it is within acceptable limits. If not, as will be described below, a suitable alarm is generated.

While the various processors and sequence control of FIG. 1 may be provided through the use of special purpose analog or digital circuits or combinations thereof, it is preferred in the practice of the invention to utilize a programmed computer to accomplish the various functions since the computer may also be used to perform other control functions not associated with the invention. It will be understood, therefore, that the term processor is employed to represent that circuit operation of the programmed computer which performs the function defined by the program described herein. In practice, the program may be read from a wired or read-only memory or be entered as software into a general purpose computer. In some cases, as in the case of the transport distance processor, a combination of hard-wired circuits and a computer program may be employed to accomplish the desired function. Before considering the specific details of the computer program for accomplishing the function set forth in FIG. 1, the method of control will be considered. The reference signal applied to regulator 100 may be defined as:

$$REF = SO + XAVG + KM(DF)$$

where $$DF = FA - FO.$$

The term SO represents the initial screwdown position measured by signal SA at the beginning of a regulation cycle, XAVG represents the averaged gauge deviation measurement preceding the initiation of the regulation cycle and DF, representing the rolling force change, is initially set to zero at the beginning of the regulation cycle with FA = FO (initial rolling force). Regulator 100 is then operated in a well-known manner to reduce the error signal ERR = REF − SA to substantially zero while processor 400 continuously updates signal REF as the rolling force changes so that DF has a value. When this has occurred, as is noted in FIG. 4B, a zero error flag (ZE) is set in the computer (providing the functions of FIG. 1) and is detected in the operation of the sequence control in FIG. 2 (step 209) to initiate transport distance processing, the function of which is set forth in FIG. 5. Many methods of carrying out the transport distance counting will be apparent to those skilled in the art. One suitable method of operation is to utilize a separate counting circuit which receives a comparison input signal corresponding to distance TRD and counts the roll pulses TP until the number of pulses counted is equal to TRD.

In the operation of regulator 100, the screwdown reference signal REF is continuously changed by the function KM(DF) because the rolling force varies as the screwdown position is changed. Thus, at the end of the regulation cycle, the difference DF = FA − FO has been measured and is available for use as soon as the transport distance processing has been completed. Thus, it will be seen in the specific flow diagram of FIG. 2, that a test is made in sequence control to determine if signal DP has been set; and if so, the control proceeds to calculate DKM = XTEMP/DF as previously noted. Following this calculation, deviation limit testing and averaging is performed, as will be considered in further detail below, in order to detect gauge deviations and as soon as two successive deviations exceed a limit in the preferred program shown herein, a new initial reference signal REF is generated where the rolling force difference signal is again set to zero and a new regulation cycle begins.

It may be considered that sequence control 200 includes a counter which determines the number of times the change signal DKM is produced and summed in processor 600 or that this is part of the program of processor 600. After a number of summations of signals DKM have been made (in FIG. 6A six are made), processor 600 is caused, by program control to divide the total summation by N (6) to produce the average signal DKMAVG which is added to the previous mill spring constant KM and the entire control process is reinitiated.

The flow diagram in FIG. 2 generally sets forth the sequence control steps previously noted. At the start of the sequence, a test is made in step 201 to determine whether an XRAY reading has just been made. If this has occurred, this reading is stored in a computer memory location referenced as XTEMP in step 202 and a test is then made in step 203 to determine whether the flag DP previously noted has been set. Flag DP is set, it will be recalled, if the transport measurement has been completed. If not, the sequence control terminates and reinitiates if there is an XRAY reading or, if not, if calculation is to be performed for regulation. Computer means for reinitiating sequencing cycles are well known and will not be described. Basically, such means respond to interrupts or other program initiation signals. It may be assumed that each time an XRAY reading is made an interrupt causes the start whereas the calculation of the reference updating for the purpose of regulation may be made on a periodic basis. For the purpose of explanation, it will be assumed that flag DP has been set and the next test which must be performed is to determine whether reading XTEMP relates to the first deviation after the transport distance TRD has been measured or not. This is performed in step 204. Step 204 is based upon a flag referenced as KMCK which is initially reset and then is set in step 315 in the program of FIG. 3B. For the purpose of explanation, it will be assumed that flag KMCK is not ON (exit N) and that program control then goes to processor 3000 (TLIM), the function of which will be described with reference to FIG. 3A. This program is referenced as TLIM to summarize its function of limiting and testing gauge deviation.

Referring now to FIG. 3A, it is noted that the first test (step 301) is whether XTEMP is greater than a +1 percent deviation. If it is, step 302 tests to see if a flag referenced as PLIM has been set. If so, the program of FIG. 3B (XAVG) is entered where the gauge deviation is averaged. If not, flag PLIM is set in step 303 and then signal XTEMP is stored as XRAY1 in step 305 and the sequence ends. If XTEMP does not exceed a positive 1 percent deviation, a test is made in step 306 to see if it exceeds a negative 1 percent deviation. If so, a test is made to determine if the NLIM flag has been set in step 307. If not, this flag is set in step 304 and step 305, previously noted, is performed and the sequence is ended. If the NLIM flag had been set as noted in step 307, then exit is made to the XAVG function described in FIG. 3B. If step 306 does not detect a negative deviation exceeding 1 percent, then steps 308 and 309 are entered where both flags PLIM and NLIM are reset and the sequence is ended.

The function set forth in FIG. 3A is to first detect one occurrence of a 1 percent deviation either plus or minus and set an appropriate flag and then, after the next XRAY reading, to determine whether a second deviation of the same sense has occurred. If two successive deviations exceeding a gauge deviation limit have occurred, then the XRAY averaging operation described in FIG. 3B is entered. If a single deviation occurs followed by the failure of the deviation to exceed either limit, both of the flags are reset to reinitiate the testing.

In FIG. 3B, step 310 provides for the averaging of XRAY1 and XTEMP by summing them and dividing by 2. In step 311, a roll force reference flag RFRFG is set and is tested in step 205 of FIG. 2 as will be discussed later. The purpose of flag RFRFG is to signal to control 200 that the initial roll force FO must be stored before beginning the next regulation cycle. Step 312 in FIG. 3B calls for the reading of screwdown signal SA to establish the initial screwdown signal SO used by processor 400. In step 313, the roll force difference signal DF is set to zero and then the zero error flag ZE is reset in step 314. Following this, the first deviation cycle flag KMCK is set in step 315 and then in step 316, flag DP is reset. This completes the steps which are necessary to prepare the system for processing a new reference signal (REF) as is done in step 401 of FIG. 4A.

Before considering the reference signal processing and regulation, reference is made again to FIG. 2 where now it will be considered that flag KMCK has been set and step 204 of FIG. 2 then causes the system to proceed to first reset flag KMCK in step 206 and then to proceed to the DKM computation program of FIG. 6A. In step 601 of FIG. 6A, the calculation DKM = XTEMP/DF is made and this is followed by the summation step 602 where DKM is added to the previous SUMDKM. It may be assumed that the system is initialized with SUMDKM equal to zero and this sum is reset to zero in step 610 of FIG. 6B to reinitiate another averaging cycle. In step 603, an increment I is increased which may be assumed to be initially equal to one as it is set in step 611 of FIG. 6B, and this is followed by a test in step 6-4 to determine whether the desired number of summations has been performed. As an example, the test is made against seven which would provide six summations before completing this sequence. If the increment I is equal to seven the program proceeds to the DKMAVG function of FIG. 6B which will be briefly described. in step 605, DKMAVG is generated as SUMDKM/6 and then, in steps 606 and 607, tests are made to determine whether the averaged correction exceeds plus or minus 0.2KM. If these tests reveal that DKMAVG is within 0.1KM, a new mill spring constant KM is generated equal to the summation of the previous signal KM and the correction DKMAVG in step 609. If either of tests 606 or 607 reveals too large a correction, an alarm is set in step 608. The sequence of FIG. 6B then proceeds to reset the SUMDKM in step 610 previously noted and to reset the increment I to 1 in step 611.

Each time the deviation limit testing and averaging function of processor 300 has been completed, a new reference is generated as set forth in step 401 of FIG. 4A where signal SO is the initial screwdown setting read during step 312 of FIG. 3B and the roll difference signal DF has been set to zero in step 313 in FIG. 3B. Step 402 is considered to be a call for the screwdown position regulator program which is brought into operation through well known programming means and is generally summarized in FIG. 4B. As previously noted, the function of regulator 100 is to control motor 110 until the position error noted in step 403 is substantially zero. If the error tested in step 404 is not greater than zero step 405 provides for the setting of the flag ZE which is used in the sequence control to initiate the transport distance measurement as previously noted. If the error is greater than zero step 406 is entered to perform a function translation which must be performed to translate the position error (REF - SA) into a speed control for motor 110. This may be performed as a table look-up function within a programmed computer or in a well known analog function generator.

Referring now again to FIG. 2, it will be assumed that the regulation cycle is in process and that an XRAY reading is not being made. The roll force flag has been set in step 311 of FIG. 3B and therefore in step 207, the initial roll force FO is measured and stored. Following this, the flag RFRFG is reset in step 208 and the sequence is ended. When the sequence reinitiates, step 205 causes proceeding to step 209 where the zero error flag ZE is tested and will be assumed, for the present, to not have yet been set. Therefore, the program enters the reference signal generating operation (REF), described above, with reference to FIG. 4A, to change the screwdown setting until the zero error flag is finally set after several sequences of this type in step 405 of FIG. 4B. When this is detected in step 209, the system enters the transport distance measuring sequence of FIG. 5 which will not be described.

In step 501, a roll pulse TP is counted and then in step 502, the count is compared to the representation of the transport distance TRD. If the count is equal to TRD, flag DP is set in step 503 which prepares the system, as previously noted, to enter deviation testing and DKM computation. If the count is not equal to TRD the function of step 501 is repeated. The flow diagram of FIG. 5 does not represent an actual program since the counting and comparison function may preferably be performed in a special circuit which generates an interrupt for the computer system when the pulse count is equal to TRD. Step 503, therefore, may be considered to be part of an interrupt program which goes into operation as soon as the pulse count is equal to TRD and sets flag DP.

From the foregoing description it should now be apparent that the present invention provides an effective means for providing mill spring constant corrections on-line during mill rolling where the correction is averaged over a number of cycles and appropriately limited. While the control has been described as a general purpose computer program, it will be understood that special purpose digital systems may be constructed to perform the functions of the program and in some cases certain functions may be performed with analog components to provide what is referred to, in the art, as a hybrid system.

We claims as our invention:

1. The method of rolling a strip of ductile material to produce a predetermined output gauge comprising measuring gauge deviations remaining after each of a series of screwdown regulation cycles; producing a corresponding series of ratio signals after each occurrence of a zero error signal in a preceding regulation cycle, where each ratio signal is produced by dividing the remaining gauge deviation by the change of roll force which occurred during the preceding regulation cycle; and averaging the ratio signals to produce a mill spring correction signal for the next series of regulation cycles.

2. The method of claim 1 wherein each ratio signal is generated after the strip has moved from the point of rolling to the point of deviation measurement spaced from said point of rolling by a predetermined transport distance.

3. The method of claim 1 wherein the regulation cycle is controlled according to a reference signal produced as a function of the initial screwdown position at the start of a regulation cycle, the gauge deviation existing at the beginning of the cycle, and the product of mill spring constant times the change of roll force necessary to reduce the error signal to zero.

4. The method of claim 3 wherein said reference signal is defined as $REF = SO + XAVG + KM(FA - FO)$ where SO is the initial screwdown position; XAVG is an averaged XRAY deviation signal; KM is the last corrected mill spring constant; FO is the initial rolling force and FA is the measured rolling force during the screwdown regulation cycle.

5. The method of claim 4 wherein said ratio signal is represented by the function $DKM = XO/DF$ where DKM represents a change in mill spring constant that is to be electrically averaged, XO is the gauge deviation remaining after the last regulation cycle and DF represents the change of roll force which occurred during the last regulation cycle.

6. The method of claim 3 wherein each regulation cycle is continued until $REF - SA = 0$, where SA represents the actual screwdown position.

7. The method of claim 5 wherein said averaging step is performed by performing the summation of signal DKM a number of times and then by dividing the final summation by the number to produce said mill spring constant correction signal.

8. In a system for automatically controlling the gauge of a strip of material rolled through a mill stand, where a position regulator receives a screwdown reference signal and a signal representing the actual screwdown position and responds thereto to adjust the rolling force until the error between the reference signal and the position signal is substantially zero, a gauge deviation correction control comprising: first means for measuring the gauge deviation at a predetermined transport distance from the rolling stand; second means operative each time after said position regulator has produced a substantially zero error signal and after the strip element then has moved through said predetermined transport distance to said second means for producing a mill spring constant correction signal proportional to the average summation of gauge deviation divided by roll force change.

9. The gauge deviation correction control of claim 8 wherein said position regulator is controlled by a reference signal produced as a function of initial screwdown position, average XRAY deviation exceeding a predetermined limit and the product of the last set of mill spring constant times change in roll force.

10. The gauge deviation correction control defined in claim 9 wherein said reference signal is defined by the function $REF = SO + XAVG + KM(FA - FO)$.

11. The correction control of claim 10 wherein each change signal is defined as $DKM = XO/DF$ where XO represents gauge deviation remaining after zero error regulation and DF is the change of rolling force which occurred during the zero regulation cycle.

12. The gauge deviation control of claim 11 wherein said second means produced an average correction signal $DKMAVG = SUMDKM/N$ where SUMDKM represents the summation of a series of N change signals DKM.

13. In combination: a screwdown position regulator responsive to a reference signal and a screwdown position signal for adjusting the rolling force until the error between the reference signal and the position signal is substantially zero; deviation limit testing and averaging means for producing a gauge deviation signal representing average gauge exceeding predetermined limits; a mill spring averaging processor for producing an averaged mill spring correction signal as a function of a number of gauge deviations remaining after the operation of said position regulator and as an inverse function of the corresponding rolling force changes occurring therein; and a screwdown reference signal processor for periodically updating the reference signal as a function of said averaged mill spring correction signal.

14. The combination of claim 13 wherein a transport distance processor is included for precisely determining when an element of rolled strip corresponding to zero regulation error has moved from the rolling position to the position of deviation measurement.

15. The combination of claim 13 wherein a sequence control is provided to cause operation of said deviation limit test and averaging such that two successive deviations must be detected to exceed a predetermined limit before the next regulation control is caused to begin.

16. The combination of claim 15 wherein said predetermined limits are + and − 1 percent.

17. The combination of claim 13 wherein said screwdown reference signal processor produces said reference signal according to the function $REF = SO + XAVG + KM(FA - FO)$.

18. The combination of claim 13 wherein said mill spring averaging processor produces said averaged correction signal as the function $DKMAVG = SUMDKM/N$ where SUMDKM represents the summation of a series of N mill spring changes.

* * * * *